(12) United States Patent
Pedersen (10) Patent No.: US 8,713,146 B2
(45) Date of Patent: Apr. 29, 2014

(54) CHANGE MANAGEMENT AUTOMATION TOOL

(75) Inventor: Sean M Pedersen, San Jose, CA (US)

(73) Assignee: Ebay Inc., San Jose, CA (US)

( * ) Notice: Subject to any disclaimer, the term of this patent is extended or adjusted under 35 U.S.C. 154(b) by 515 days.

(21) Appl. No.: 12/413,301

(22) Filed: Mar. 27, 2009

(65) Prior Publication Data
US 2010/0251247 A1  Sep. 30, 2010

(51) Int. Cl.
| | |
|---|---|
| G06F 15/16 | (2006.01) |
| H04L 12/24 | (2006.01) |
| H04L 12/26 | (2006.01) |
| H04L 12/28 | (2006.01) |
| H04L 12/58 | (2006.01) |
| H04L 29/06 | (2006.01) |

(52) U.S. Cl.
CPC ............. *H04L 12/24* (2013.01); *H04L 12/2602* (2013.01); *H04L 12/2801* (2013.01); *H04L 41/00* (2013.01); *H04L 41/046* (2013.01); *H04L 41/048* (2013.01); *H04L 41/0654* (2013.01); *H04L 41/0813* (2013.01); *H04L 41/082* (2013.01); *H04L 41/0803* (2013.01); *H04L 41/0806* (2013.01); *H04L 51/00* (2013.01); *H04L 51/04* (2013.01); *H04L 51/046* (2013.01); *H04L 65/40* (2013.01); *H04L 65/403* (2013.01)
USPC ........... 709/223; 709/201; 709/202; 709/203; 709/205; 709/206; 709/217; 709/218; 709/219; 709/224; 709/225; 709/227; 705/305; 705/30; 705/32; 705/7.13; 705/7.14; 705/7.16; 705/7.21; 705/7.36; 718/100; 718/102

(58) Field of Classification Search
CPC ..... H04L 41/0806; H04L 51/00; H04L 51/04; H04L 51/046; H04L 41/0803; H04L 41/00; H04L 41/046; H04L 41/048; H04L 41/0654; H04L 41/0813; H04L 41/082; H04L 65/40; H04L 65/403; H04L 67/42; H04L 12/24
USPC ......... 709/223, 201, 202, 203, 217, 218, 219, 709/224, 245, 246, 248, 205, 206, 225, 709/227; 718/102, 103, 104, 105, 100; 705/300, 301, 305, 30, 32, 7.13, 7.14, 705/7.16, 7.21, 7.36; 715/748, 751
See application file for complete search history.

(56) References Cited

U.S. PATENT DOCUMENTS

| | | | |
|---|---|---|---|
| 5,479,343 A * | 12/1995 | Matoba et al. | ................ 700/106 |
| 6,295,540 B1 * | 9/2001 | Sanschagrin et al. | ................ 1/1 |
| 6,633,900 B1 * | 10/2003 | Khalessi et al. | ............. 709/202 |
| 7,020,697 B1 * | 3/2006 | Goodman et al. | ............ 709/223 |

(Continued)

*Primary Examiner* — Saket K Daftuar
(74) *Attorney, Agent, or Firm* — Haynes and Boone, LLP (57) ABSTRACT

A change management system for an IT environment or other enterprise level environment may comprise a server comprising memory and a controller. A change management application comprising machine readable instructions may be stored in the memory. The change management application may be arranged to perform the following steps: receive a plurality of work orders via a network to be performed during a maintenance period, concatenate the plurality of work orders to generate a master plan for performing the work orders during the maintenance period, and receive status updates for the work orders during the maintenance period down to the individual step level. A display may display a view of the master plan during the maintenance period. The view may include information related to the work orders and a status of the work orders. The status may be updated automatically based on status updates received by the change management application.

21 Claims, 6 Drawing Sheets

(56) References Cited

U.S. PATENT DOCUMENTS

| | | | |
|---|---|---|---|
| 7,340,037 B1* | 3/2008 | Jean et al. | 379/9.02 |
| 7,346,531 B2* | 3/2008 | Jacobs | 705/7.15 |
| 7,467,198 B2* | 12/2008 | Goodman et al. | 709/223 |
| 7,469,219 B2* | 12/2008 | Goldberg | 705/7.13 |
| 7,487,105 B2* | 2/2009 | Jacobs et al. | 705/7.19 |
| 7,647,391 B1* | 1/2010 | Jean et al. | 709/223 |
| 7,769,715 B2* | 8/2010 | Carberry et al. | 707/618 |
| 7,840,434 B2* | 11/2010 | Ingman et al. | 705/7.16 |
| 7,934,019 B2* | 4/2011 | Bonar et al. | 709/248 |
| 8,060,401 B2* | 11/2011 | Ingman et al. | 705/13 |
| 8,417,368 B2* | 4/2013 | Lilly et al. | 700/100 |
| 8,538,788 B1* | 9/2013 | Spiegel et al. | 705/7.11 |
| 2001/0047288 A1* | 11/2001 | Jacobs et al. | 705/9 |
| 2001/0049619 A1* | 12/2001 | Powell et al. | 705/9 |
| 2002/0010610 A1* | 1/2002 | Jacobs et al. | 705/8 |
| 2002/0010615 A1* | 1/2002 | Jacobs | 705/9 |
| 2002/0065700 A1* | 5/2002 | Powell et al. | 705/9 |
| 2002/0188524 A1* | 12/2002 | Shimizu | 705/26 |
| 2003/0078798 A1* | 4/2003 | Zaks et al. | 705/1 |
| 2003/0204431 A1* | 10/2003 | Ingman | 705/9 |
| 2004/0019515 A1* | 1/2004 | Senyurt | 705/9 |
| 2004/0220848 A1* | 11/2004 | Leventhal | 705/9 |
| 2005/0004945 A1* | 1/2005 | Cossins et al. | 707/104.1 |
| 2005/0182650 A1* | 8/2005 | Maddox et al. | 705/1 |
| 2005/0289013 A1* | 12/2005 | Goldberg | 705/26 |
| 2006/0059253 A1* | 3/2006 | Goodman et al. | 709/223 |
| 2007/0050340 A1* | 3/2007 | von Kaenel et al. | 707/3 |
| 2007/0174070 A1* | 7/2007 | Jafa et al. | 705/1 |
| 2007/0219803 A1* | 9/2007 | Chiu et al. | 704/270.1 |
| 2007/0220062 A1* | 9/2007 | Carberry et al. | 707/201 |
| 2008/0091289 A1* | 4/2008 | Gozzi et al. | 700/100 |
| 2008/0159274 A1* | 7/2008 | Brugman et al. | 370/356 |
| 2008/0195576 A1* | 8/2008 | Sande et al. | 707/2 |
| 2008/0288539 A1* | 11/2008 | Jacobs | 707/104.1 |
| 2009/0006185 A1* | 1/2009 | Stinson | 705/10 |
| 2009/0024999 A1* | 1/2009 | Ingman et al. | 718/102 |
| 2009/0055719 A1* | 2/2009 | Cossins et al. | 715/204 |
| 2009/0125368 A1* | 5/2009 | Vujicic | 705/9 |
| 2009/0157488 A1* | 6/2009 | O'Neil et al. | 705/11 |
| 2009/0171743 A1* | 7/2009 | Spiegel et al. | 705/9 |
| 2010/0057510 A1* | 3/2010 | Stevens et al. | 705/7 |
| 2010/0150318 A1* | 6/2010 | Irenze et al. | 379/21 |
| 2010/0150319 A1* | 6/2010 | Irenze et al. | 379/21 |
| 2010/0312604 A1* | 12/2010 | Mitchell et al. | 705/9 |

* cited by examiner

Outage Plan for MAINT09358295 - 2009.04.28 20:00 IT Maint Development Non-Code (08:00PM - 03:00 AM)
Show: All Tasks [Printable]
Viewing Filters: All Steps | PreFlight | InFlight | Rollback | PostFlight | Expand all | Collapse all ☐ Tech Resource

| Step | Seq | Type | Start Time | Duration (Minutes) | End Time | Task Summary | Task Details | Responsible | Status |
|---|---|---|---|---|---|---|---|---|---|
| ☐ CHNGE101140371 - Test CR for | | | | | | | | PreFlight | InFlight | Rollback | PostFlight | |
| 1 | 1 | Standard | 07:00PM | 5 | | Pre Maintenance Step | Pre Maintenance Step | Tech Resource | Waiting ☐ |
| 2 | 2 | Standard | 07:05PM | 5 | | Pre Maintenance Step | Pre Maintenance Step | Tech Resource | Waiting ☐ |
| 3 | 3 | Standard | 07:10PM | 5 | | Pre Maintenance Step | Pre Maintenance Step | Tech Resource | Waiting ☐ |
| 4 | 1 | Standard | 08:00PM | 5 | 08:05PM | Inflight Step Summary | Inflight Step Detail | Tech Resource | Waiting ☐ |
| 5 | 2 | Standard | 08:05PM | 5 | 08:10PM | Inflight Step Summary | Inflight Step Detail | Tech Resource | Waiting ☐ |
| 6 | 3 | Standard | 08:10PM | 5 | 08:15PM | Inflight Step Summary | Inflight Step Detail | Tech Resource | Waiting ☐ |
| 7 | 4 | Standard | 08:15PM | 5 | 08:20PM | Inflight Step Summary | Inflight Step Detail | Tech Resource | Waiting ☐ |
| 8 | 5 | Checkpoint | 08:20PM | 5 | 08:25PM | Checkpoint | Checkpoint Details | Tech Resource | Waiting ☐ |
| 9 | 6 | Standard | 08:25PM | 5 | 08:30PM | Inflight Step Summary | Inflight Step Detail | Tech Resource | Waiting ☐ |
| 10 | 7 | Rollback | 08:30PM | 5 | | Rollback Step | Rollback Step Detail | Tech Resource | Waiting ☐ |
| 11 | 8 | Rollback | 08:35PM | 5 | | Rollback Step | Rollback Step Detail | Tech Resource | Waiting ☐ |
| 12 | 9 | Standard | 08:40PM | 5 | | Rollback Step | Rollback Step Detail | Tech Resource | Waiting ☐ |
| 13 | 10 | Standard | 08:45PM | 5 | | Post Maintenance Step | Post Maintenance Step Detail | Tech Resource | Waiting ☐ |
| 14 | 1 | Standard | 08:50PM | 5 | | Post Maintenance Step | Post Maintenance Step Detail | Tech Resource | Waiting ☐ |
| 15 | 2 | Standard | 08:55PM | 5 | | Post Maintenance Step | Post Maintenance Step Detail | Tech Resource | Waiting ☐ |
| 16 | 3 | Standard | 09:00PM | 5 | | Post Maintenance Step | | Tech Resource | Waiting ☐ |
| ☐ CHNGE101140381 - Standard Test Template 2 | | | | | | | | PreFlight | InFlight | Rollback | PostFlight | |
| 17 | 1 | Standard | 07:00PM | 5 | | Pre Maintenance Step | Pre Maintenance Step | Tech Resource | Waiting ☐ |
| 18 | 2 | Standard | 07:05PM | 5 | | Pre Maintenance Step | Pre Maintenance Step | Tech Resource | Waiting ☐ |

CHANGE MANAGEMENT AUTOMATION TOOL

BACKGROUND

1. Technical Field

Embodiments of the present disclosure relate, generally, to managing changes in an information technology (IT) environment.

2. Related Art

In the field of information technology (IT), "change management" generally refers to a system or process for managing changes to the IT environment, for example the installing, updating, or maintaining software, hardware, servers, network devices, switches, firewalls, or any other aspect of the IT environment. Procedures have been developed for managing and coordinating such changes in an effort to reduce or mitigate problems associated with conducting such maintenance. Change management procedures may be particularly helpful in managing maintenance and/or changes performed in large-scale or enterprise scale IT environment.

Change management procedures involve manually creating maintenance work orders or job "tickets" to be performed during a maintenance period, creating a "master plan" by manually collating or concatenating the various work orders, and manually tracking and recording the performance of each separate work order during the execution of the maintenance plan. Generally, a hard copy of the master plan will be printed prior to a maintenance or change period, and marks indicating completion of various tasks or steps are made on the list, for example using highlighters, as reports of completion are received by the change manager. The reports may be made and received using an online chat system or other method of communicating progress. Manually creating the individual work orders, the master plan, and manually tracking and recording the execution of the work orders requires a certain amount of time to perform the various, manual, manpower-intensive tasks associated with the change management process. Although commercially available programs exist that assist some aspects of change management, for example Excel or other spreadsheet programs, or off-the-shelf change management tools such as BMC Software's Remedy Change Management Application (REMEDY), those programs require a certain number of manual steps or operations in the change management process. A more efficient change management process may reduce costs, improve reporting, and increase system up-time.

SUMMARY

According to one or more embodiments, a change management system for an IT environment may comprise a server comprising memory and a controller. A change management application comprising machine readable instructions may be stored in the memory. The change management application may be arranged to perform the following steps: receive a plurality of work orders via a network to be performed during a maintenance period, concatenate the plurality of work orders to generate a master plan for performing the work orders during the maintenance period, and receive status updates for the work orders during the maintenance period. A display may show a view of the master plan during the maintenance period. The view may include information related to the work orders and a status of the work orders. The status may be updated automatically based on status updates received by the change management application.

These and other features and advantages of the present invention will be more readily apparent from the detailed description of the embodiments set forth below taken in conjunction with the accompanying drawings.

BRIEF DESCRIPTION OF THE FIGURES

FIG. 4 illustrates an example embodiment of a screen for entering steps of a work order in a change management system.

FIG. 5 illustrates an example embodiment of a view of a status display in a change management system.

Exemplary embodiments and their advantages are best understood by referring to the detailed description that follows. It should be appreciated that like reference numerals are used to identify like elements illustrated in one or more of the figures, wherein showings therein are for purposes of illustrating exemplary embodiments and not for purposes of limiting the same.

DETAILED DESCRIPTION

Embodiments of the present disclosure relate to a change management system 100 for managing changes or maintenance in an IT environment 102. The IT environment 102 may include software, hardware, servers, network devices, switches, firewalls, or any other aspect of the IT environment. The changes to be made may include installing, updating, or maintaining any aspect of the IT environment. Elements of the IT environment may communicate over a common network, multiple networks, intranet, or Internet. The IT environment may be self-contained and interoperable, or may include various portions that are separate from one another and do not connect. In an example embodiment, the IT environment may include all or most of the IT framework, infrastructure, hardware, and software used by a business entity, subgroup, department, or other division of a business entity in running its business. Although the business entity may be of any size or complexity, the larger the business entity and/or more complex the IT environment, the greater the perceived need for a more efficient IT environment change management system may be. The IT environment may be used, for example, on an enterprise scale.

In an example embodiment, the system 100 may provide for a level of automation in the creation of a master plan for changes to be made during a change period or maintenance period. The automated system 100 may result in various efficiencies. For example, the time for creating a master plan may be reduced at least because the system 100 may automatically concatenate various job "tickets" or work orders to be performed. Recurring tasks may be automated. The time for executing a master plan may be reduced because the reporting and monitoring aspects of the system 100 may have closer to real-time reporting and monitoring than the manual/chat-monitoring system used in more manual change management systems. The more real-time updating aspects of the system 100 may include individual technicians being able to enter status reports from a tech station during a change period, and such reported changes may be received and displayed on a display in the network operations center (NOC). Down time on the system may be reduced due to faster execution of a change plan. The master plan may be easier to assemble because the various technicians may generate job tickets or work orders that get automatically concatenated in the master plan, reducing both the burden of preparing the ticket and reducing the time to compile and create a master plan from all of the various job tickets or work orders. Information collected during the generation of work orders, assembling the master plan, and execution of the plan may be collected and used as input to various metrics or reports for improved planning and system reliability.

Figure 1:
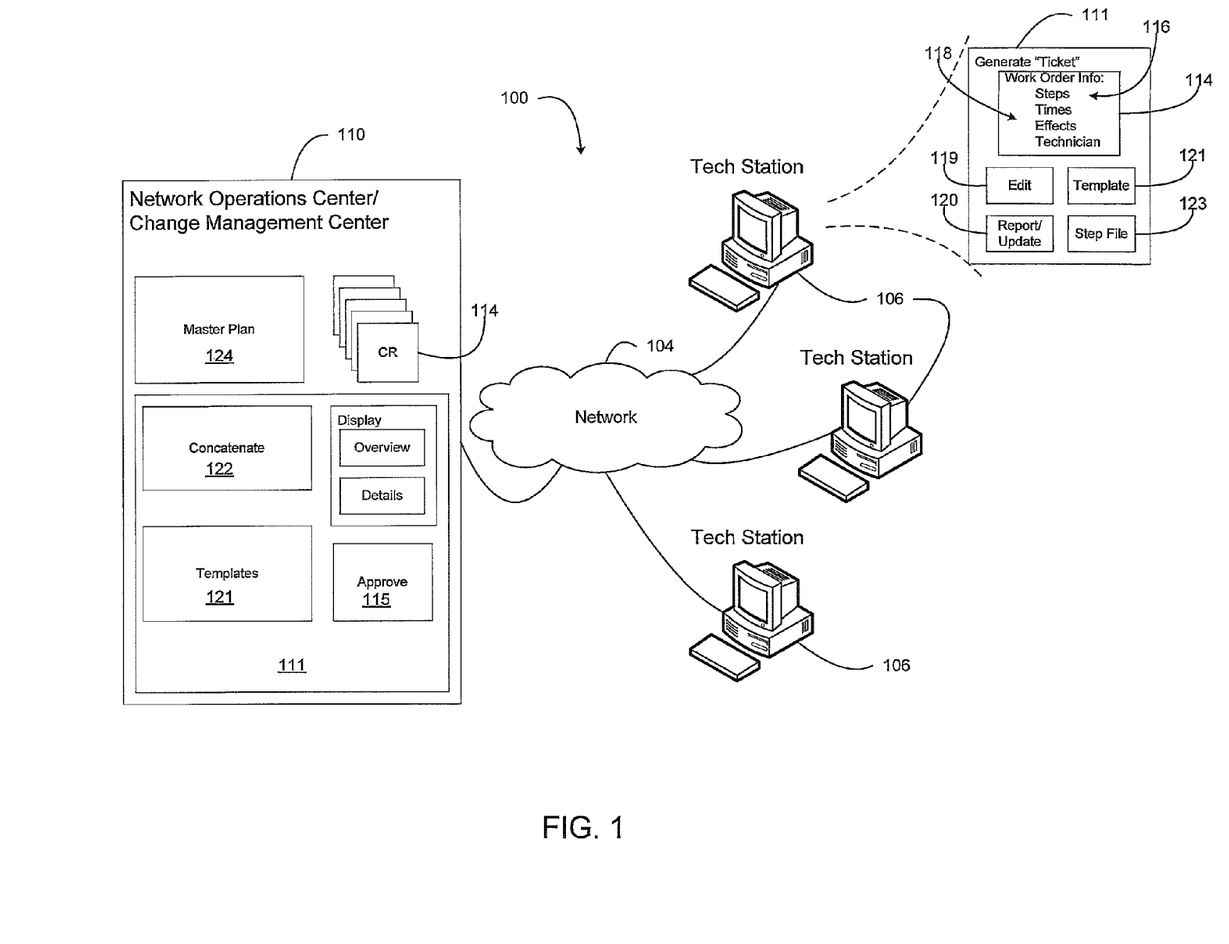
FIG. 1 illustrates an IT change management system in one or more embodiments.

FIG. 1 illustrates one or more embodiments of IT change management system 100. In an example embodiment, the system 100 may include a change management center 110, for example a Network Operations Center (NOC). A change manager may use a change management application 111 to organize, coordinate, and supervise the planning, execution, and reporting of changes made. The NOC may be a physical location with supporting hardware or may be a virtual NOC (vNOC) that may be generated on a display at any location where a change manager runs the change management application 111 using change manager tools and a display.

The change management application 111 may include software, a software module, or machine-readable instructions stored in memory on a server or servers. The change management application 111 may run on a server accessible in the NOC and may communicate over a network 104 with remote servers, for example tech stations 106. The software application may be stored on, run on, or accessible from the server. The software application 111 may also be accessible via a graphical user interface (GUI) accessed from a tech station 106, such as from a remote tech server. Software modules, compatible applications, or sub-applications of the change management application 111 may be separately stored at or on tech station 106 and may be interoperable with the change management application 111 run from the NOC. The change management application 111 may refer to the application run at the NOC, the modules run at the tech stations, or both. The server 110 may include stored templates 121 available for browsing by remote tech stations 106 running the change management application 111.

In an example embodiment, technicians, operators, or users may use the change management application 111 from tech station 106 to input individual work orders 114 each related to a specific change or changes to be made during a maintenance period, and each including one or more steps 116 to be performed in association with the work described on a job ticket 114. A user may input a work order or job ticket 114 from a tech station remote from the NOC or the server. The application 111, sub-application, or module running or accessed from the tech station may provide for user input, for example by keystroke or other appropriate method, to create an electronic file or files corresponding to the job ticket 114, steps to be performed 116, and any other information 118 required or desired for efficient change management.

The information 118 may include, for example, the time to perform the change, the time required to complete the change, the system effects on other parts of the system that may be affected by the change during the change period, and the identity or identities of the technician scheduled to perform, supervise, and/or report the change. A user may edit or update the ticket if required or desired prior to making the change during a change period, and may report or update the steps as they are completed during a maintenance period.

Work Order

In an example embodiment, work order or job ticket 114 or change request (CR) may include information relevant to the change or maintenance to be performed. The information may include information related to the maintenance or change generally and may include specific information related to individual steps that make up the maintenance or change to be made. The information relevant to each step of a job ticket may include, for example, timing, type, sequence, start time, duration, summary, detailed description, group, assignee (responsible person), site and environment.

"Timing" may describe the time period during which the steps are to be performed. The timing may be pre-maintenance to be performed prior to the maintenance window, during maintenance to be performed during a maintenance time window, or post maintenance to be performed after the maintenance time window.

"Type" may refer to a general type of step to be performed. Types of steps may include standard (general steps performed within a maintenance window), checkpoint (a pause to verify functionality/stability of a change), or rollback (steps used to return a system to its previous state, for example normal operating condition).

"Sequence" may refer to the order in which the steps are to be performed. In an example embodiment, the same sequence numbers may be assigned to various steps to be started at the same time.

"Duration" may refer to the time period for a particular step to be performed.

"Summary" may include a text summary of each step to be performed, for example "reboot exchange server," "verify logs," or any other description of a particular step in a particular work order.

"Detailed Description" may include a more detailed description of the step summarized in the summary. The detailed description may include the script to be used, detailed instructions for performing a step, or any other information that may be of interest to the technicians performing the step or the change managers monitoring, verifying, planning, and executing the change period.

"Group" may refer to the name of a group responsible for carrying out a particular step. For example, a group may be a division, database engineers, network engineers, Unix administrators, electricians, or the name of a vendor contracted to perform work.

"Assignee" may refer to the name, title, or other identifier of a technician to perform an individual task. If more than one technician is performing a step or task, the name, title or other identifier of the technician responsible for providing an update to the status of the step during the maintenance period may be listed.

"Site/Business Unit" may refer to a particular business unit, network, website, or other designator that generally describes a sub-environment in which the maintenance is to be performed.

"Environment" may refer to what parts of the environment for the overall "site/business unit" the change or maintenance may be made. Examples of the "environment" may include "All," "Production," "QA," "Development," or any other designator that generally describes what part or subset of an overall IT environment a maintenance task is to be performed in. The information to be included in a step for a work order may be tailored to the needs of a user, to provide a level of identification, reference, or other designation of where a particular job order is to be made.

In an example embodiment, a technician may create the work order or job ticket 114 or CR using a software generation module 120 or application for generating or creating the work order. The generation module 120 may permit, for example, creating a work order by inputting all pertinent information. The information may be input in one or more various input modes, for example, manually, using a stored template 121, and/or uploading steps from an offline-created file 123 as discussed below, with respect to FIG. 2. The work order may be created online or offline.

In an example embodiment, a user may submit the work order or CR to the manager or change manager, for example over a network. The change management application 111 may receive the job ticket 114 via the network 104 and may save the job ticket 114 on the server 110.

Master Plan

In an example embodiment, when a ticket is generated at a remote tech station, the information may be communicated to the master control program over the network 104. In an example embodiment, the various work orders or job tickets 114 may be received from the various users and collected and stored by the change management application 111. The change management application may use a job tickets 114, and may use a master plan module to generate and store the master plan 124 generated by the application 111. A change manager may approve 115 a work order or orders for inclusion in a master plan. Routine, planned, or repetitive maintenance work orders may be approved automatically for inclusion in the master plan.

The change management application 111 may have a display module 126 that may extract information from the master plan 124 for display on a screen or other display visible to a change manager in the NOC. The display may show an overview view 127 with information related to a number of work orders or a more-detailed view 128 with information, for example, related to one work order. The display module may generate scalable, customizable, and filterable views that may display the information in one or more modes at the same time, alternately, or toggle back and forth between various view modes.

The view or views may be displayed in an overview format, detailed format, graphical format, text format, or any combination thereof. In an example embodiment, details may be generated by request from an overview format. For example, an overview that illustrates the time for performing a change graphically, maneuvering a cursor over a particular item with a mouse, a click, or other method of issuing an electronic signal, to cause a drop down menu or pop-up, or other visual display to show information related to the particular work order, for example time left, or names of persons performing the maintenance.

In an example embodiment, a CR 114 from a technician may be forwarded to the change manager in more than one way. The information may be collected by the change management application for concatenation, may be forwarded by e-mail to a change manager, or both. The change manager may review the uploaded CR by logging into the change management application or by opening the received e-mail. The change manager may approve or disapprove the work order contained in the CR for inclusion in the master plan. The manager may approve the CR by clicking a link provided in the e-mail, or by otherwise selecting to approve the CR for inclusion in a master plan. Clicking the link from the e-mail may send a notification to the change management application that may then update the master plan by approving a work order. A manager may also be able to access the uploaded CRs through an interface of the change management application. A manager may elect to approve CRs by selecting or indicating approval by a means provided on the display of the change management application, for example by navigating a cursor over a button to be selected, making an appropriate keystroke, or any other available method of inputting a signal indicative of approval.

Method

Figure 2:
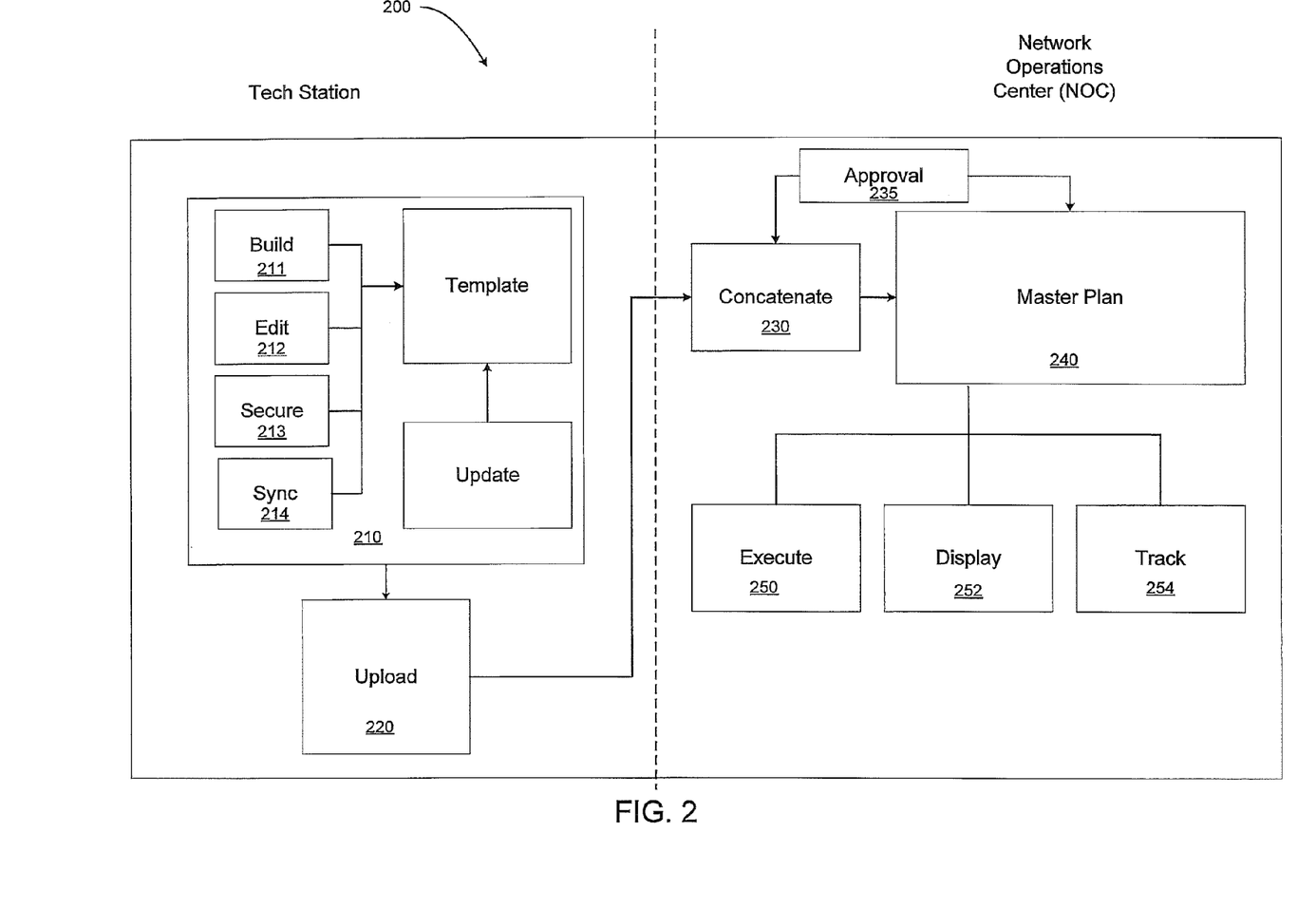
FIG. 2 illustrates a method of managing changes to an IT system in one or more embodiments.

FIG. 2 illustrates a method 200 for managing changes in an IT environment. In an example embodiment, the method may include generating 210 a job ticket or work order, submitting or uploading 220 the work order, concatenating 230 the uploaded job tickets, and generating 240 a master plan. The method 200 may operate in one or more embodiments of a change management system, for example, similar to the one shown in and described with respect to FIG. 1.

Generating a Work Order

In an example embodiment, generating 210 a work order or CR may include building 211, editing 212, and securing 213 the work order. Building 211 the work order may be accomplished in any manner provided, for example, manually, using a template, or offline (e.g. creating a *.csv format file to be uploaded into the application for submission).

Manual

In an example embodiment, creating a new work order or CR may include "manually" creating the new job ticket. In this context, manual may refer to a user manually inputting (e.g., typing) some or all of the information to be included in a work order responsive to prompts or inputs displayed by the change management application. The 'manual' creation may be automated to some degree, for example by automatically providing certain prompts of certain information fields to be input, automatically processing such information as it is input or after the information is input or the job ticket is complete, and automatically forwarding the work order for approval and inclusion in a master plan. The term manual is used for explanatory purposes and to contrast this method from the off-line or template methods described below.

In an example embodiment, the change management application may prompt a user to select a New IT Change Request (CR). A Change Request may be a request for approval of a work order. The CR may be prepared as though it is a work order or job ticket, but may not become part of a final master plan until after approval by a change manager.

Figure 3:
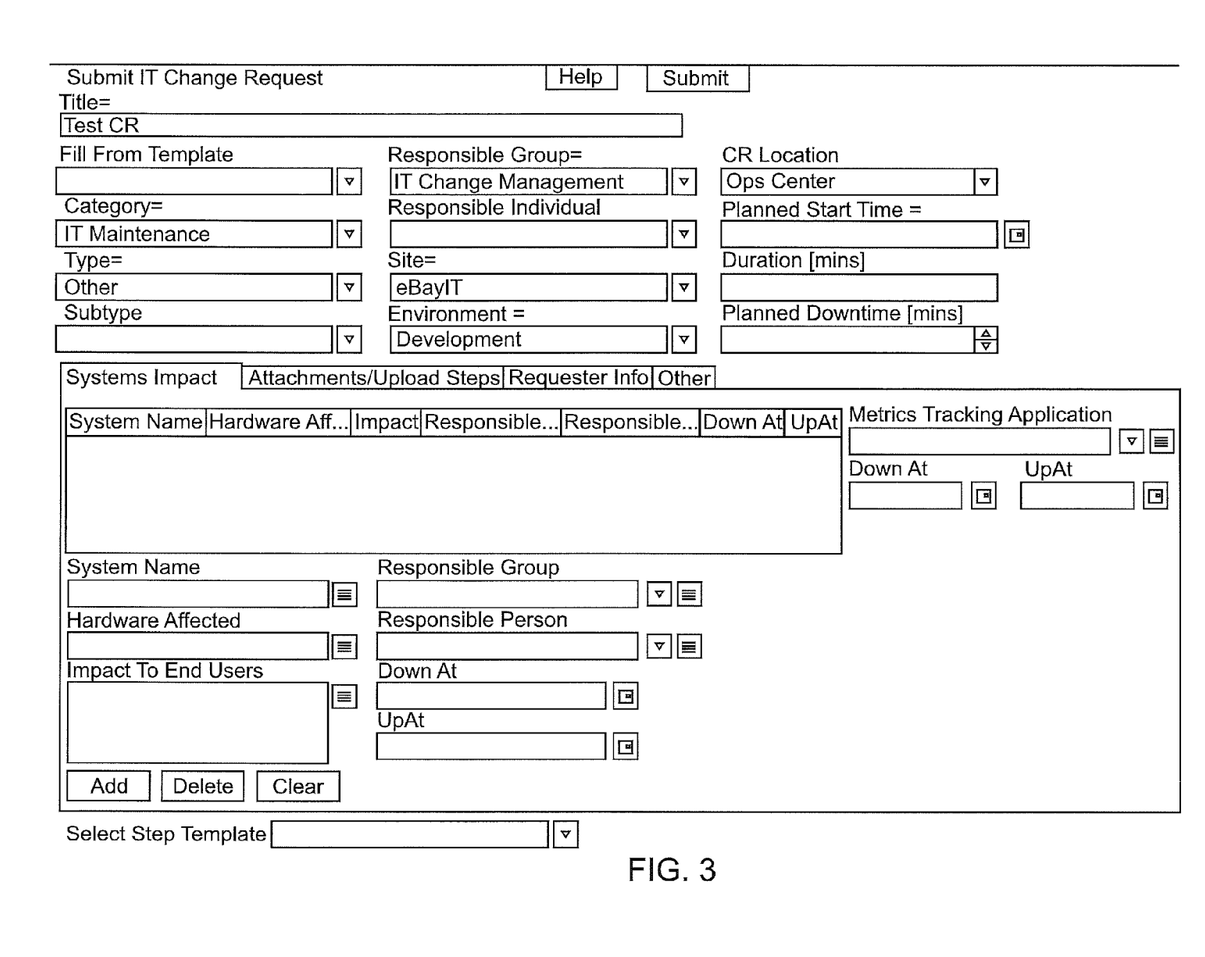
FIG. 3 illustrates an example embodiment of a screen for building a work order in a change management system.

FIG. 3 illustrates an example embodiment of a screen for building a work order in a change management system. For each type of information to be included in a work order, there may be a number of fields to input, either by selecting from a menu, for example a drop down menu of radio buttons, or by manually typing in or entering steps to be performed. The example screen in FIG. 3 can be used to create a change ticket and add the metrics information. It can also use a pre-saved template for the plan or to fill out the fields in the ticket (two different types of templates that are used).

In an example embodiment, a user may input information related to the effects or impact that a given work order may have on the IT environment. The change management application may provide a means for inputting the systems impact information, for example by providing a "systems impact" field to be filled in by the user. The "systems impact" may describe various effects, for example whether a server or servers will be offline, be rebooted, updated, or any other systems impact. The systems impact field may he entered as free-form text in a manner that a user would want the information to be viewed by the change manager, for example in a change manager notification e-mail.

In an example embodiment, a user may fill out information for a 'Metrics Tracking Application' where one is provided. The Metrics Tracking fields are used to track the true down and up time of systems of interest. The Metrics Tracking Application may be custom tailored for a specific user and a specific IT environment or system to track information or maintenance records of interest to a particular user. Tracking true down time of an application, for example, if the application is required to be up and running 99.8% of the time over the course of a year, providing the 'true down time' will allow management to tell if they are within that expected up time. In an example embodiment, the Metrics Tracking Application may be filled in by clicking on a down arrow appearing next to a 'Metrics Tracking Application' field on a user display and expanding a telescoping list of systems on which the change or maintenance is to be performed. Systems that may be listed include top level group corporate messaging, sub level e-mail, chat, and mobile messaging, top level group customer support applications, and sub level customer support chat and customer support e-mail.

In an example embodiment, various attachments may be uploaded and attached to the CR. Attachments to be uploaded and attached may include, for example, any files relevant to the ticket such as impact lists for patching or firewall maintenance, and may include offline-created maintenance steps to be imported to the CR, for example steps stored in a *.csv format as discussed below.

In an example embodiment, manually creating a CR may include inputting steps to be performed. The steps may be input by first scrolling down to or otherwise navigating to a 'Steps' section provided by the change maintenance application on an input screen. Selecting or clicking on an 'Add/Edit Steps' option may open a new window or pop-up labeled 'Steps Management'.

FIG. 4 illustrates an example embodiment of a screen for entering steps of a work order in a change management system. A 'Steps Management' module of the change maintenance application may include, for example: Steps for Change Request—This is the field to view the CR steps that have been added; Step Creation/Modification—This is where the step details are created or edited; and Step Resource Assignment—Use this field to update the step assignee information on multiple lines at once. The screen shown can be used to create, edit, or update the maintenance plan for an individual ticket, including using a pre-saved template.

In an example embodiment, a user may fill in any fields for which information is requested. Some of the fields may include drop down menus or other lists of information that may be selected without typing text. Other fields may be filled by entering text. There may be fields available for all of the information to be included in a work order, for example as discussed above with respect to FIG. 1. A user may verify that all step-start/end time and date are correct before submitting the CR. The times may be changeable, for example by selecting the first step in each 'Timing' section, correcting the start time and date, and clicking the 'Modify' button. After the start times of the first steps are corrected, a "Sync" button may cause a Sync module to run for automatically checking whether steps, as entered, are synchronized correctly or need correction.

Sync Function

The 'Sync' function allows a user to update the start time and end time of a series of steps within a maintenance plan that occur sequentially, without needing to manually update the start/end time of each step in the maintenance plan.

Creating/Converting a Plan to the .csv Format

In an example embodiment, building a work order 211 may include creating steps offline for later uploading into a CR and uploading the steps from an offline file. The steps may be created, for example, in a spreadsheet format, for example in a *.csv format. The *.csv format may be similar to a spreadsheet, e.g. EXCEL, format. Using a *.csv formatted file may allow work orders or steps for work orders to be uploaded directly into the change management application, from which work order may be generated, submitted, approved, and automatically concatenated into the master plan. Creating offline files with maintenance or change steps to be performed as part of a work order may also enable a technician to save maintenance plans as an online template for later use within the change management automation ("CMA") tool.

In an example embodiment, an offline file may include as many columns of information as there are fields of information for each step. For example, a *.csv file may include Timing, Type, Sequence, START_TIME, DURATION, SUMMARY, DETAILED_DESCRIPTION, Group, Assignee, SITE and ENVIRONMENT, as discussed above. The appropriate information for each field may be input by a user. In an example embodiment, an offline file format may not permit blank fields. In that event, each field must he filled with some content. For example, if there is a summary for a step but not a detailed description, the summary may be input twice—once in the summary field and once in the detailed description field. If the .csv file is not filled out or formatted correctly, the 'details' section of the plan upload window will denote which line of the .csv file returned an error, allowing the technician to correct or modify their plan accordingly. Thus, if there are errors, the 'Details' section may display any such errors during the 'upload' process. In the displayed details, the row number that caused the error may be identified and an accompanying error message may be displayed. Steps that produce an error may not be included in the plan. A user may correct a step by correcting manually editing the steps, editing an off-line file from which the steps were uploaded, or by editing a template from which the steps were taken.

FIG. 5 illustrates an example embodiment of a view of a status display in a change management system. The view illustrates some of the information corresponding to information fields input for each step of a work order. Checkpoint steps, for example, are called out under the 'Type' column. All steps that are not CheckPoints or Rollbacks are considered 'Standard'. FIG. 5 shows an example of a concatenated master plan, where the technicians or users can update the status of their individual steps in the execution of their work during a maintenance window and use different filters for viewing the plan.

If changes to any of the uploaded steps are required, a user may edit 212 the steps and/or may any other changes prior to submitting the request, such as through the screen in FIG. 4.

After the work order has been built, edited and synced, a user may select submit or upload on the Steps Management screen to submit 220 the work order to the change management application for approval, concatenation, and inclusion in the master plan for the maintenance period.

Using a Previously Saved Template

In an example embodiment, building 211 a work order may include building the work order from a pre-saved template. The work order may be built from prompts on the change Request display, for example, as shown in FIG. 3. After filling out the basic fields on the top of the form, a user may scroll down to the 'Steps' section. Selecting or clicking on an 'Add/Edit Steps' link or prompt may cause a new window to pop up. Under the 'Saved Step Templates' heading, a user may navigate, for example by clicking a down arrow for a drop-down menu, and then select the desired template from a list of stored templates. If a user does not see the desired template, a 'Filter By' selection may be used to narrow or broaden the list of templates viewed in the display.

In an example embodiment, a template may be used in whole or in part, and may be used without changes or appropriate changes may be made prior to submission depending on the system requirements or desires. The changes may be made only in the CR for submission and the template may be left unchanged. If all of the steps are relevant for a particular application, all of the steps may be automatically applied, for example by selecting an 'Apply All Steps' function, for example by clicking on a button. If only certain steps are to be used, those steps may be selected, for example by highlight the desired steps and holding down the CTRL key and clicking the needed steps, and then selecting 'Apply Selected Steps,' for example by clicking a button to add the selected steps. After applying the steps, a user may verify that the start and end times of the steps are accurate. To update the start/end times of the steps, a user may select the first step in each 'timing' section, correct the start time and date and select 'Modify,' for example by clicking a button.

Create a New Template from a Manual CR

In an example embodiment, a user may create a new template after creating a CR. For example, after adding maintenance steps to a CR either manually or by uploading from a file, a user submits a CR, the user may document the number of the CR, call up a record of the CR, change the name, and select "save as" a template, for example by selecting "Save Template." In other embodiments, a user may be prompted to select "create template" prior to submitting a CR, and the change management application may create a template upon submission of the CR.

Create a New Template Manually

In an example embodiment, a user may create a new template manually. The change management application may have a 'create template' mode that may be selected. The 'create template' mode may include a step creation/modification function and a resource assignment function. In the creation/modification function, a user may input information related to various steps as prompted and similar to how the steps are input as described above with respect to manually creating a CR. In the resource assignment function, a user may update the assignee for multiple steps at one time. In an example embodiment, the template may be automatically saved as you create it.

Edit—Add Steps to an Existing Plan

In an exemplary embodiment, generating 210 a work order may include editing or updating 212 an existing CR. The change management application may provide for changing the resource assignee, adding steps, removing steps, using the sync function to synchronize times of steps, or for any of the other information saved as part of a CR or work order.

Sync Function

The Sync Steps option may be used to synchronize times. On the 'Steps Management' screen shown in FIG. 4, the user may verify that the duration and sequence for all steps are correct. For any steps that the user does not want to be automatically synced, the 'CR Sync' checkbox can be unchecked and the "Modify" button clicked under the heading, 'Step Creation/Modification'. Note that all of the steps in FIG. 4 have the same start time before a sync. Clicking the 'Sync Steps' will automatically adjust the Start and End times of all pre and inflight steps in accordance with their sequence and duration.

The 'CR Sync' option is useful when there is a particularly long step and the user does not want/need to wait for that long step to complete before starting the next step in the plan. It also allows the user to schedule an individual step to begin at what ever time is preferred, regardless of the timing of the other steps. All of the Start and End times in FIG. 4 will change to reflect their appropriate sequence and duration. After modifying the steps, the start and end times of the steps are verified for accuracy. To update the start/end times of the steps, the first step in each 'Timing' section is selected, the start time and date are corrected, and the 'Modify' button is clicked. After the start times of the first steps are corrected, the 'Sync Steps' button is clicked to update the times for the remaining steps.

Clicking 'Submit' in the top right-hand corner of the screen completes the changes.

Secure

In an example embodiment, generating a work order or CR may include securing the work order. Securing the work order may include security locking of the work order to prevent unauthorized changes. In an example embodiment, security locking may include security against making unauthorized changes to the maintenance plan or against adding another CR to the maintenance window, thus requiring all changes to go through and be approved by the change manager or the like. Access to make changes may be permitted only to certain designated technicians, for example the technician who prepared the work order, managers of the technician, or the change manager. After the work order has been approved and included as part of a master plan, permissions may be granted only to the change manager, who may grant access to make changes upon request or for any other appropriate reason. Providing security for work orders may improve planning and coordination and may improve efficiency of the change management system.

Concatenating

In an example embodiment, the method 200 may include concatenating 230 all of the various job tickets to be performed in a particular change or maintenance period. The work orders included in the master plan may include work orders built and uploaded from one or more technicians from one or more tech stations. The job tickets may also include one or more planned maintenance changes automatically generated from a library of planned, scheduled maintenance.

The concatenating module may order work orders and/or steps from various work orders according to one or more filters. For example, it may order steps and/or work orders according to start time and end time. In the event that there is a conflict, an indication may appear in a display of the master plan and/or a message may be generated and sent to a change manager. Conflicts may be discussed with affected technicians, but the procedure for receiving the CRs and concatenating them to create the master plan and identify any conflicts may be automated.

Generate Master Plan

In an example embodiment, the method 200 may include generating a master plan. The master plan may be assembled based on the results of the concatenation of the work orders. Work orders may be included in a master plan only upon approval 235 from the change manager. For routine or repetitive maintenance tasks, approval may be automatic.

Execute

The method 200 of managing change may include executing 250 the master plan. During execution, the various technicians at the various remote maintenance sites may provide updates via the change management application as steps are performed. The updates may update records in the change management application to reflect current status of a work order, which may be displayed visually on a display or screen monitored by a change manager at the NOC. The information may be displayed, for example, as a page of a Change Management Dashboard or vNOC.

In one example, the CMA tracks the status of the individual steps, which is-different than the status of a ticket. The status of a ticket may be 'in progress' or 'complete'. For example, if the user has a CR that lasts four hours and the report indicates the ticket is 'in progress,' the user report will inform the user that all is well, unless the ticket is not marked complete within that four hour window. The technician may be three hours behind in their work, and the user would not know until the four hour window has passed. The CMA Tool tracks the status of the individual steps within a CR, providing an up to the minute snapshot of the progress of the ticket and/or all the tickets in the maintenance window. So if the technician is as little as one minute behind schedule, the user will know about it right away.

The Change Management Dashboard or Maintenance Plan may be accessed by selecting a link on a page of the change management application as displayed on a screen. A dashboard is the screen where a change manager or like individually tracks the status of the steps within a CR or change window.

In an example embodiment, the vNOC may include a view or a link to a view of the maintenance plan. Note that the link does not need to be published in vNOC; it can be emailed or posted to any internal company portal, intranet site, etc. In an example embodiment, a maintenance plan view may display information related to the master plan and/or certain work orders and/or steps of a particular work order. For example, a maintenance plan view may include Step; Sequence; Type; Start Time; Duration (Minutes); End Time, Task Summary; Task Details; and Responsible (identifying the person responsible for the step tasks).

Display

In an example embodiment, the maintenance plan view may display 252 the status of execution of the master plan. There may be several alternatives available to view the plan, work order or orders, or tasks assigned to a technician. During execution, each person involved in the maintenance may have an appropriate view displayed at their tech station. An individual maintenance person assignee of particular steps of a work order may have a view of the tasks in steps assigned to the technician.

Figure 6:
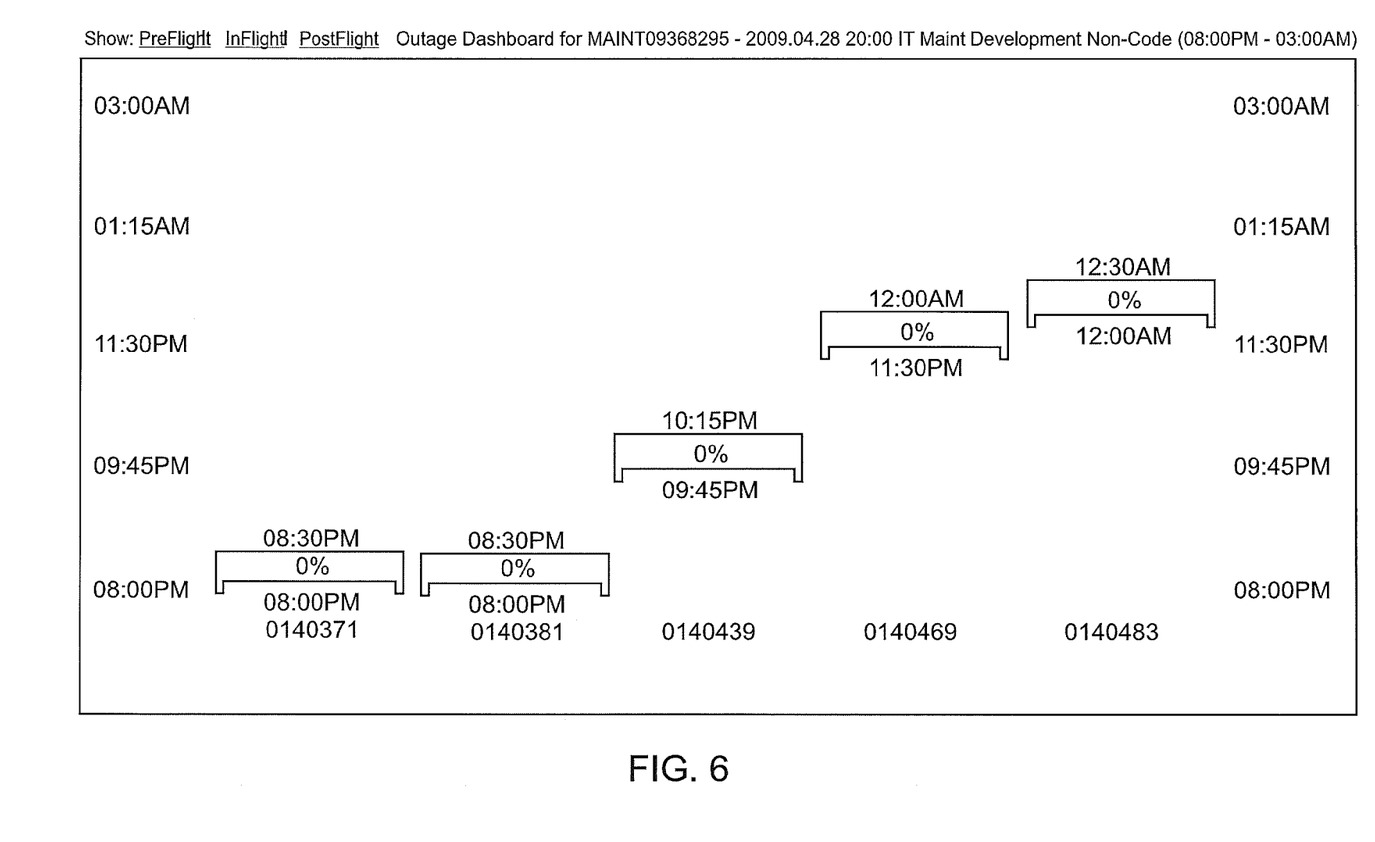
FIG. 6 illustrates an example embodiment of a view of a status display in a change management system.

FIGS. 5 and 6 illustrate example embodiments of a technician view of a work order and a change manager view of a master plan, respectively. The technician view may be limited to information related to the steps involved in a particular work-order. A technician performing a change or maintenance may input updates of the status for each step as appropriate.

Technician View

During a maintenance period, a technician may have the change management application technician view open on a display of a tech station. The technician may update the status of various steps to be performed as they are completed. Moreover, the only item which may need to be updated during a maintenance window is the 'Status' field. The status field may be a drop-down menu or any other appropriate input means as desired, which must be completed by the technician during the scheduled maintenance window for the particular work order and/or step.

In an example embodiment, there may be up to four or more different Status types for each step within a work order. The Status types may include, for example, 'waiting'—which may be the default status for each step, 'work in progress'— may be used during longer steps to indicate that work on the step has been started although it is not yet complete, 'complete'—to be used when a step is complete, and/or 'canceled'—to be used when a step has been canceled.

In an example embodiment, the status for a step may be updated by highlighting the step with a mouse or otherwise navigating to and selecting the step, and selecting the Status update button, for example a drop-down-menu. It may also be possible to tab through the steps and use hot keys to update the status (e.g., "C" for complete, etc.). Once a status has been selected for a step, there may be no need to hit the enter key. The information may be automatically pulled from the page into the change management application and the change manager's view updated and a record of completion made in the application. A work order may only be recorded or displayed as "complete" when the status for each step within the work order has been updated as 'Complete' or 'Cancelled'.

The technician view may permit a technician to see the work order and steps for which they are responsible, and the work orders and steps that others are responsible. A user may be able to expand or collapse the steps for a particular work order if there is no user responsibility or not need to see steps of a particular order. A user may be able to expand their view of the work order for which they are responsible in order to see all of the steps for which they are responsible. In an example embodiment, information that is not displayed may be accessed by clicking or selecting an appropriate link or button on the screen, or by fly-over with a cursor or similar navigation device. For example, the contact information for a responsible technician may be accessible although it does not display in the normal display mode. In some embodiments, responsible technicians may have read/write access to their maintenance steps for updating the status, but may have read only access to other maintenance steps for which they are not responsible. In some embodiments, some users may have a read only view.

Change Manager View

In an example embodiment, a change manager view (FIG. 6) may include an overall summary of work to be performed during a maintenance period. The view or dashboard is a graphical representation of the maintenance window and shows the status of the individual change request (CR) and the corresponding steps. The display may be graphic or text or a combination of both. The display may include a view of an overview of information and the change management application may provide for access to more detailed information by navigating the display and selecting, highlighting, or navigating a cursor to an appropriate link or other function.

The change manager view may include, for example, graphic displays representative of the time various work orders are to start, the time that they are to end, and the status of completion. The view may use bar graph-type displays as illustrated in the example view of FIG. 6, wherein a vertical position of the bottom of a bar representative of a work order corresponds to the time of starting the work order, the vertical height of the bar may correspond to the planned duration of the work order, a second bar displayed in conjunction with the first bar may increase in length as each step of a work order is reported complete, such that the length of the second bar is representative of the percentage of completion of the steps of the work order. The view may be shown on a single screen or page for ease of use and viewing.

In an example embodiment, the bars may he color-coded and the color-coding may correspond to the status of a work order. For example, if the status of a work order is on-time, and the planned steps are completed on or ahead of schedule, the bar may be a color, for example a shade of green. If the status of a work order is behind schedule, the bar may be displayed in a different color, for example a shade of red. If the status of the work order is complete or cancelled (rolled back)—then the bar may display a different color, for example purple. Different color schemes may be used to display various statuses as desired.

In an example embodiment, text displayed along with a bar may include information related to the work order, for example name of environment or sub-system affected, name of the person responsible, system effects, or any other information desired.

In an example embodiment, additional information may be accessed via the change manager view. For example, clicking on a bar associated with a particular work order may call up a pop-up window or other new display element showing all of the steps of the work order, similar to the technician view shown in FIG. 5. The pop-up or other display element may open a new window upon selection of a link or button, or may display information when a cursor is navigated over portion of the display, or both.

In an example embodiment, selecting an 'All Steps' link in the 'plan' display may display all steps of a particular work order or the steps for all the work orders within a maintenance window. To view the plan in a printable format, the user can click a 'printable' link. Clicking on 'All Tasks' returns the view to the normal view. The work order view may be filtered by time, for example by pre-maintenance period, during the maintenance period, rollback, or post-maintenance period. The work order or work orders may be expanded or collapsed, for example, by selecting an 'expand all' or 'collapse all' link or toggle.

Track

Such procedures are generally designed to coordinate multiple maintenance, repair, or change tasks to minimize system or sub-system down time and to avoid unintended or other negative effects on system or network operation due to such tasks being performed.

Such change management procedures are particularly important with larger systems or networks, for example, systems or networks on an "enterprise scale." As system complexity grows, tasks performed on one element of the system may increasingly affect other systems. It can be a major task to plan system tasks, predict what system elements will be affected, and to avoid or limit negative effects on system performance.

Tracking maintenance may include collecting outage information, metrics, tracking down time of a system to help determine that systems overall availability, or up-time within a given time period. This information can be used to create several different types of reports that give insight into the stability of a particular system or application, the effectiveness of the team supporting that system or application, and the effectiveness of the overall IT or operational organization in efforts to maintain and update the systems and applications supported.

In implementation of the various embodiments, the change management system 100 may comprise a personal computing device, such as a personal computer, laptop, PDA, cellular phone or other personal computing or communication devices. The change management system may comprise a network computing device, such as a server or a plurality of servers, computers, or processors, combined to define a computer system or network to provide the payment services provided by a payment provider system.

In this regard, a computer system may include a bus or other communication mechanism for communicating information, which interconnects subsystems and components, such as processing component (e.g., processor, micro-controller, digital signal processor (DSP), etc.), system memory component (e.g., RAM), static storage component (e.g., ROM), disk drive component (e.g., magnetic or optical), network interface component (e.g., modem or Ethernet card), display component (e.g., CRT or LCD), input component (e.g., keyboard or keypad), and/or cursor control component (e.g., mouse or trackball). In one embodiment, disk drive component may comprise a database having one or more disk drive components.

The computer system may perform specific operations by processor and executing one or more sequences of one or more instructions contained in a system memory component. Such instructions may be read into the system memory component from another computer readable medium, such as static storage component or disk drive component. In other embodiments, hard-wired circuitry may be used in place of or in combination with software instructions to implement the invention.

Logic may be encoded in a computer readable medium, which may refer to any medium that participates in providing instructions to the processor for execution. Such a medium may take many forms, including but not limited to, non-volatile media, volatile media, and transmission media. In various implementations, non-volatile media includes optical or magnetic disks, such as disk drive component, volatile media includes dynamic memory, such as system memory component, and transmission media includes coaxial cables, copper wire, and fiber optics, including wires that comprise bus. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted.

In various embodiments, execution of instruction sequences for practicing the invention may be performed by a computer system. In various other embodiments, a plurality of computer systems coupled by communication link (e.g., LAN, WLAN, PTSN, or various other wired or wireless networks) may perform instruction sequences to practice the invention in coordination with one another.

Computer system may transmit and receive messages, data, information and instructions, including one or more programs (i.e., application code) through communication link and communication interface. Received program code may be executed by processor as received and/or stored in disk drive component or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present invention to the precise forms, displays, or particular fields of use disclosed. It is contemplated that various alternate embodiments and/or modifications to the present invention, whether explicitly described or implied herein, are possible in light of the disclosure. Having thus described various example embodiments of the disclosure, persons of ordinary skill in the art will recognize that changes may be made in form and detail without departing from the scope of the invention. Thus, the invention is limited only by the claims.

What is claimed is:

1. A system for managing change or maintenance of an information technology (IT) environment, the system comprising:
    a server comprising a memory and a controller;
    a change management application comprising machine readable instructions stored in the memory, wherein the change management application, when executed, causes the controller to perform a method comprising:
        receiving a plurality of work orders, wherein the plurality of work orders comprise all work orders to be performed during a change or maintenance period for the IT environment, and wherein the plurality of work orders each comprise one or more individual steps to be performed in association with the corresponding work order, the individual steps each having a respective sequence and duration;
        adjusting a start time and end time of each of the individual steps according to its respective sequence and duration;
        concatenating the plurality of work orders to generate a single page plan of all work orders to be performed during the change or maintenance period, wherein the concatenating comprises: (i) ordering the individual steps from the plurality of work orders according to the adjusted start time and end time of the individual steps and (ii) generating a notification upon identification of a conflict between at least two of the individual steps being ordered so that affected personnel can address the conflict;
        tracking each of the individual steps that is completed during the change or maintenance period; and
        updating a degree of completion for each of the work orders in response to completion of corresponding one or more of the individual steps during the change or maintenance period; and
    a display for displaying a change manager view of the single page plan of all work orders being performed during the change or maintenance period, the change manager view including information indicative of the degree of completion for a selected one or more of the work orders, the information being updated during the change or maintenance period.

2. The system of claim 1, wherein the change manager view comprises a graph or bars representing the degree of completion for the selected one or more of the work orders.

3. The system of claim 1, wherein the tracking each of the individual steps comprises receiving inputs by users in the change management application, the inputs each indicating completion of a corresponding one of the individual steps.

4. The system of claim 3, further comprising one or more technician stations remote from the server and configured to communicate with the server via network, wherein the inputs by the users are received from the one or more technician stations.

5. The system of claim 1, wherein the information comprises percent completion.

6. The system of claim 1, wherein access to the change management application is restricted based on each user.

7. The system of claim 6, wherein the restricted access is for access to specific work orders.

8. The system of claim 1, wherein the method further comprises receiving a selection of one or more of the individual steps to exclude from the adjusting of the start and end time.

9. A method of managing change or maintenance of an information technology (IT) environment, comprising:
    receiving a plurality of work orders at a computer, wherein the plurality of work orders comprise all work orders to be performed during a change or maintenance period for the IT environment, and wherein the plurality of work orders each comprise one or more individual steps to be performed in association with the corresponding work order, the individual steps each having a respective sequence and duration;
    adjusting a start time and end time of each of the individual steps according to its respective sequence and duration;
    concatenating, by the computer, the plurality of work orders to generate a master plan of all work orders to be performed during the change or maintenance period, wherein the concatenating comprises: (i) ordering the individual steps from the plurality of work orders according to the adjusted start time and end time of the individual steps and (ii) generating a notification upon identification of a conflict between at least two of the individual steps being ordered so that affected personnel can address the conflict;
    tracking each of the individual steps that are completed during the change or maintenance period;
    updating a degree of completion for each of the work orders in response to completion of corresponding one or more of the individual steps during the change or maintenance period; and
    displaying, by the computer on a display, a change manager view of the master plan of all work orders being performed during the change or maintenance period, the change manager view including information indicative of the degree of completion for a selected one or more of the work orders, the information being updated during the change or maintenance period.

10. The method of claim 9, wherein the change manager view comprises a graph.

11. The method of claim 9, wherein the tracking each of the individual steps comprises receiving inputs by users in the change management application, the inputs each indicating completion of a corresponding one of the individual steps.

12. The method of claim 11, wherein the inputs by the users are received from one or more technician stations remote from the computer and configured to communicate with the computer via network.

13. The method of claim 9, wherein the information comprises percent completion.

14. The method of claim 9, wherein access to the change management application is restricted based on each user.

15. The method of claim 14, wherein the restricted access is for access to specific work orders.

16. The method of claim 9, wherein the change manager view comprises bars representing the degree of completion for the selected one or more of the work orders.

17. The method of claim 9, further comprising receiving a selection of one or more of the individual steps to exclude from the adjusting of the start and end time.

18. The system of claim 1, wherein the method further comprises tracking down and up times of the IT environment.

19. The system of claim 1, wherein at least one of the individual steps comprised in at least one of the work orders is automatically generated from a template.

20. The method of claim 9, further comprising tracking, by the computer, down and up times of the IT environment.

21. The method of claim 9, wherein at least one of the individual steps comprised in at least one of the work orders is automatically generated from a template.

* * * * *